(12) United States Patent
Mintz

(10) Patent No.: US 10,095,915 B2
(45) Date of Patent: Oct. 9, 2018

(54) PHOTO SUBSCRIPTION SYSTEM AND METHOD USING BIOMETRIC IDENTIFICATION

(71) Applicant: Chaim Mintz, Cedarhurst, NY (US)

(72) Inventor: Chaim Mintz, Cedarhurst, NY (US)

( * ) Notice: Subject to any disclaimer, the term of this patent is extended or adjusted under 35 U.S.C. 154(b) by 0 days.

(21) Appl. No.: 15/415,803

(22) Filed: Jan. 25, 2017

(65) Prior Publication Data

US 2018/0211100 A1 Jul. 26, 2018

(51) Int. Cl.
*G06F 17/30* (2006.01)
*G06K 9/52* (2006.01)
*G06K 9/00* (2006.01)
*G06T 11/60* (2006.01)
*G06K 9/46* (2006.01)

(52) U.S. Cl.
CPC ... *G06K 9/00288* (2013.01); *G06F 17/30256* (2013.01); *G06F 17/30268* (2013.01); *G06K 9/4671* (2013.01); *G06K 9/52* (2013.01); *G06T 11/60* (2013.01)

(58) Field of Classification Search
CPC .... G06K 9/00288; G06K 9/4671; G06K 9/52; G06F 17/30256; G06F 17/30268; G06T 11/60
See application file for complete search history.

(56) References Cited

U.S. PATENT DOCUMENTS

| | | |
|---|---|---|
| 7,068,309 B2 | 6/2006 | Toyama et al. |
| 7,636,450 B1 | 12/2009 | Bourdev |
| 7,809,722 B2 | 10/2010 | Gokturk et al. |
| 7,945,653 B2 | 5/2011 | Zuckerberg et al. |
| 8,082,319 B2 | 12/2011 | Disario et al. |
| 8,200,775 B2 | 6/2012 | Moore |
| 8,378,817 B2 | 2/2013 | Fox |
| 8,897,508 B2 | 11/2014 | Adam et al. |
| 9,152,849 B2 | 10/2015 | Ganong et al. |
| 9,152,868 B2 | 10/2015 | Smowton et al. |
| 9,967,779 B2 | 5/2018 | Norlin et al. |
| 2005/0043897 A1 | 2/2005 | Meyer |
| 2005/0190273 A1 | 9/2005 | Toyama et al. |
| 2009/0324022 A1 | 12/2009 | Sangberg et al. |
| 2012/0303764 A1* | 11/2012 | Ibenforth ............... H04W 4/02 709/219 |
| 2015/0126845 A1 | 7/2015 | Jin |
| 2015/0269418 A1 | 9/2015 | Johnson et al. |
| 2018/0035074 A1* | 2/2018 | Barnes, Jr. ............. H04N 5/772 |

* cited by examiner

*Primary Examiner* — David F Dunphy

(57) ABSTRACT

A computer system and method for photo subscription using biometric identification is provided. A plurality of photographs inputted by at least one photo provider system is accessed. Biometric data is accessed from a plurality of accounts associated with a pool of respective subscribers, each account having at least one associated biometric signature. A request is received to transmit photographs associated with biometric data to a selected destination, the biometric data associated with a particular subscriber. A plurality of photographs is filtered based on the biometric data. The plurality of photos is then outputted to the selected destination.

3 Claims, 8 Drawing Sheets

PHOTO SUBSCRIPTION SYSTEM AND METHOD USING BIOMETRIC IDENTIFICATION

FIELD OF THE DISCLOSED TECHNOLOGY

The disclosed technology relates generally to dissemination of photographs to targeted individuals, and more specifically, the present disclosure relates to a photo subscription service for distribution of photographs using biometric identification.

BACKGROUND OF THE DISCLOSED TECHNOLOGY

Businesses and organizations create and make photograph repositories available to subscribers to store large quantities of photos so that subscribers can access the photos by perusing the photo repositories. Photographs are a way to engage customers and share moments of interest with family and friends. However, browsing through a photograph repository, or searching for photos of interest can become quite burdensome and time consuming when hundreds of photos are posted a week. At such a pace, in just a few weeks there can be thousands of photographs to search through in a single repository. A typical person who lives a very busy life may not have time to peruse or even browse through the many photos to find photographs relevant to him or her. Yet, even the quintessential busy person may want or need to access the photos relevant to him. These photos can play important roles, such as for remaining part of the life of loved ones, supervising underlings, remaining in the loop as to the safety and propriety of family members or employees.

Accordingly, there is an unmet need to automatically identify and access photographs of interest, without having to search through myriads of photos. Additionally, there is a need for providers of such photos to receive feedback regarding how well the photos fulfill the goal of providing photographs of interest to subscribers, clients, patron, and others followers of consequence.

SUMMARY OF THE DISCLOSED TECHNOLOGY

Embodiments of the disclosure include a computer system for a photo subscription service using biometric identification. The computer system includes a memory configured to store instructions, and a processor, disposed in communication with said memory. The processor, upon execution of the instructions is configured to access a plurality of photographs inputted by at least one photo provider system. The processor is further configured to access biometric data from a plurality of accounts associated with a pool of respective subscribers, such that each account has at least one associated biometric signature.

The processor is configured to receive a request to transmit photos that correspond with biometric data associated with a particular subscriber to a selected destination. The processor is additionally configured to filter the plurality of photos based on the biometric data accessed. A photo or subset of photos is selected based on the filtering and outputted to a selected destination via electronic communication. In an embodiment of the present disclosure, the at least one biometric signature associated with a subscriber can be at least one face, and each subscriber can associate an unlimited number of biometric signatures, such as faces, with his or her account.

In embodiments, the processor is further configured to access account data for a subscriber and/or display all photos inputted by one or more photo provider systems. In an embodiment, the processor is further configured to filter all photos inputted by one or more photo provider systems within a selected time period, based on biometric signatures associated with one or more respective subscribers, and then display the photos selected based on the results of the filtering.

In an embodiment. The processor can configure a first selected photo repository and a second selected photo repository, and output photos selected from the first selected photo repository to the second selected photo repository, in embodiments. Statistical and analytic data corresponding to one or more photo or to a subset of photos in the repository can be accessed. In an embodiment, the photo provider system can be a photo capture device. In embodiments, the photo repository server can include the photo provider system.

A method for a photo subscription service using biometric identification is provided, in an embodiment of the disclosed disclosure. A plurality of photographs stored in a photo repository is accessed. Biometric data from a plurality of subscriber accounts is accessed, such that each respective subscriber account has at least one associated biometric signature. A request to transmit photographs that correspond to biometric data associated with respective subscribers to respective selected destinations is received. The plurality of photos is filtered based on the subscriber biometric data. A photo or subset of photos is selected based on the filtering and outputted to at least one destination.

In embodiments, the step of outputting the selected photo or subset of photos to a destination includes transmitting the selected photo or subset of photos to a plurality of files, folders, and/or devices corresponding to at least one subscriber, based on each set of biometric data found in the photo or subset of photo, and such that at each file, folder, and/or device are associated with at least one biometric signature. The method includes outputting each photo to an electronic device via electronic communication, such as, but not limited to, email, application, and/or SMS text message.

In embodiments, a first selected photo repository and a second selected photo repository are each configured. Photos that are filtered and selected from the first selected photo repository are outputted to the second selected photo repository, in embodiments. A first selected subset of photos can be transmitted to a first destination, and a second selected subset of photos transmitted to a second destination different than the first destination, in embodiments.

In an embodiment, one or more photos in the photo repository are displayed upon receiving a request to display one or more photos. Upon receiving a request to display one or more photos associated with any one subscriber within a selected time period, in embodiments, the one or more photos requested within the selected time period are displayed. In one embodiment, a request for analytic data associated with the photo subscription service method is received. An analytic database is accessed. Statistics associated with the request are computed and the results are transmitted to a destination.

The method can further include the steps of computing statistics related to subscriber matches accessed as compared to a total number of photographs accessed, and/or compared to a total number of subscribers. The steps of computing statistics can include computing the number and/or percent of unique subscriber matches identified as compared to the number of subscribers subscribed. The number and/or percent of subscriber matches identified each subscriber has received can be computed. The number and/or percent of subscribers with a recent anomaly, and the number and/or percent of photos inputted by a photo provider system with zero subscriber matches detected can be computed as well. The number and/or percent of photos inputted by a photo provider system with zero biometric signatures detected, and the number and/or percent of individual potential subscribers detected in photographs can furthermore be computed, in embodiments. Instructions are sent to the photo provider system to adjust photograph generating behavior and/or subscriber generating behavior, based on said computing statistics, in embodiments.

In embodiments, the method includes the step of accessing target statistics for a particular subscriber. Statistical results for the particular subscriber are then accessed, and the target statistics are compared to the statistical results for the particular subscriber. Instructions are subsequently sent to the photo provider system to adjust photograph generating behavior for the particular subscriber if the difference between the target statistics and the statistical results for the particular subscriber exceeds a threshold. The instructions sent to the photo provider system to adjust photograph generating behavior can instruct the photo provider system to increase or decrease photograph generation in a particular time period for the instant subscriber.

BRIEF DESCRIPTION OF THE DRAWINGS

The accompanying drawings illustrate various, non-limiting, examples, inventive aspects in accordance with the present disclosure.

DETAILED DESCRIPTION OF EMBODIMENTS OF THE DISCLOSED TECHNOLOGY

Figure 1:
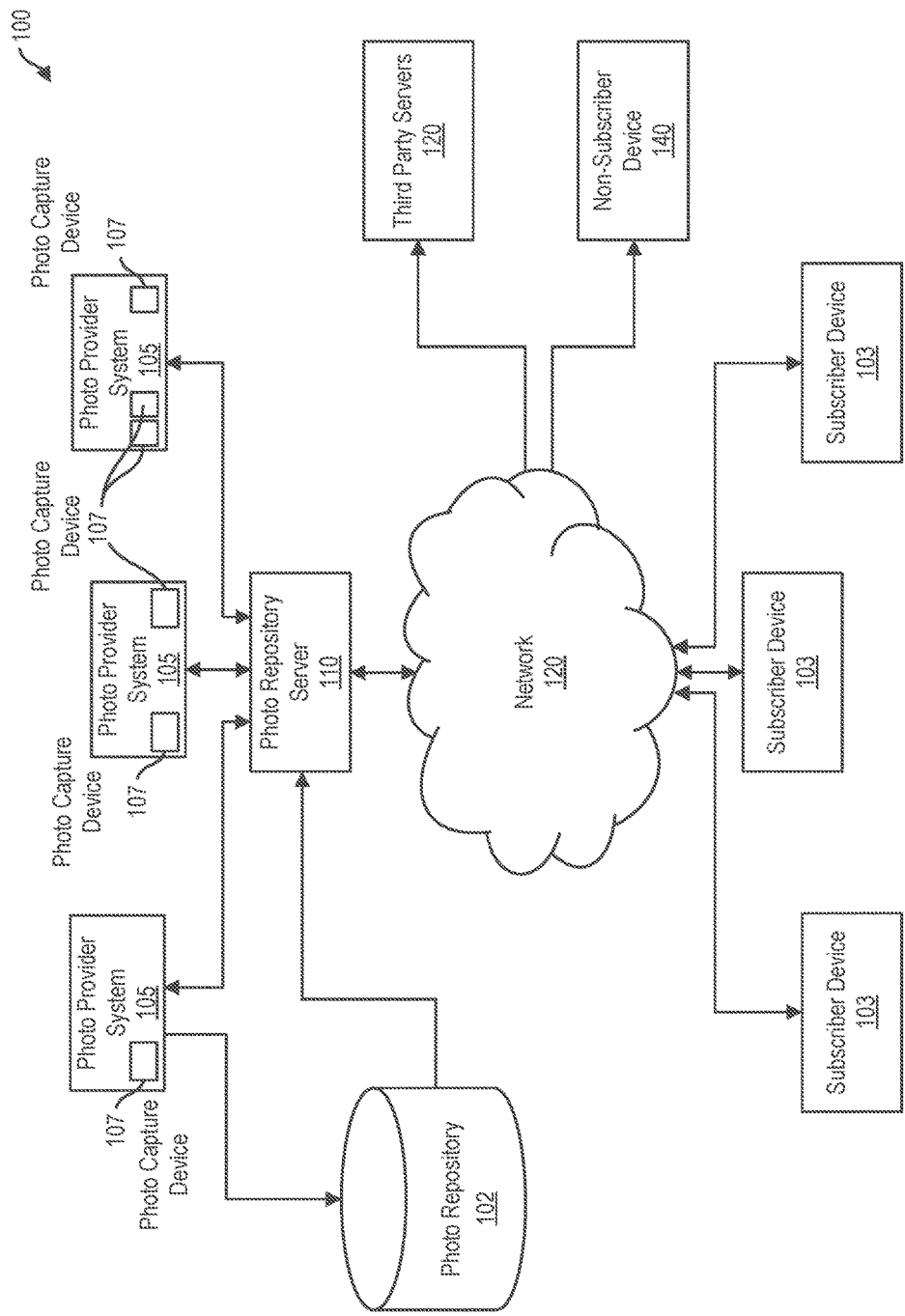
FIG. 1 is a schematic diagram of an inventive photo subscription system 100 in accordance with an embodiment of the present disclosure.

The below illustrated embodiments are directed to photo subscription systems and methods using biometric information. It is to be appreciated that the below illustrated embodiments are not limited in any way to what is shown, as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and it is contemplated herein that the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" may include a plurality of such stimuli and reference to "the request" may include reference to one or more requests and equivalents thereof as known to those skilled in the art. As used herein, the term "photograph" or "photographs" is synonymous with the terms "photo," "photos," "image," "images," and/or multimedia content.

It is to be appreciated that the certain embodiments described herein may be utilized in conjunction with a software algorithm, program code residing on computer usable medium having control logic for enabling execution on a machine having a computer processor. The machine typically includes memory storage configured to provide output from execution of the computer algorithm or program. As used herein, the term "software" is meant to be synonymous with any code, module, or program that can be executed by a processor of a host computer, regardless of whether the implementation is in hardware, firmware or as a software computer product available on a disc, a memory storage device, or for download from a remote machine. The embodiments described herein include such software and hardware to implement the equations, relationships and algorithms described below. Additionally, one or more software modules can be individual modules that communicate with one another as described, or can be combined into a single module. One or more of the software modules can be stored in the same memory or different memories, and can be executed by the same processor or by different processors.

A computer system and method for photo subscription using biometric identification is provided. A plurality of photographs inputted by at least one photo provider system is accessed. Biometric data is accessed from a plurality of accounts associated with a pool of respective subscribers, each account having at least one associated biometric signature. A request is received to transmit photographs associated with biometric data to a selected destination, the biometric data associated with a particular subscriber. A plurality of photographs is filtered based on the biometric data. The plurality of photos is then outputted to the selected destination.

Turning now descriptively to the drawings, in which similar reference characters denote similar elements throughout the several views, FIG. 1 is a schematic diagram of an inventive photo subscription system 100 in accordance with an embodiment of the present disclosure. FIG. 1 shows one or more photo provider systems 105 providing photos and/or other communications and receiving data from a photo repository server 110. The sending and receiving of information is depicted by the double sided arrows, in embodiments of the present disclosure. In embodiments, a photo provider system 105 can include one or more photo capture devices 107, wherein a photo capture device includes a camera, such as a digital camera, which in embodiments can be incorporated into a phone or tablet.

The photo provider system 105 can be a server or a computer device that can receive a collection of photos from one or more photo capture devices 107. The photo provider system 105 computing device has network capabilities for communicating with the photo repository 102 and the photo repository server 110. The computing device can be integrated with or separate from the one or more photo capture devices 107. In embodiments, the photo capture devices 107 can provide photos to the computing device which then transmits the photos to the photo repository 102. In embodiments, one or more of the photo capture devices 107 can submit photos to the photo repository 102.

In embodiments, the photo repository server 110 can include the photo provider system 105. The multiple photo provider systems 105 and devices 107 can represent an unlimited number of photo provider systems 105 in the photo subscription system 100. For example, multiple businesses and/or organizations can function as multiple photo provider systems 105 in photo subscription system 100.

A photo capture device 107 photographs various subjects of interests, and generates photographs that are then stored in a photo repository 102, which, in embodiments, can be accessed by the photo repository server 110. In embodiments, the photo capture device 107 can input photos directly to the photo repository 102, demonstrated by the one sided arrow originating from the photo provider system 105, containing one or more photo capture devices 107, and terminating at the photo repository 102. In embodiments, the photo provider system 105 can input photographs to the photo repository server 110 through an intermediary (such as the photo provider handler 155 shown in FIG. 2), which then transmits the photographs to the photo repository 102.

The photographs in the photo repository 102 can be accessed upon request through a network 120 by subscriber devices 103 of subscribers who have subscribed to a photo accessing service provided by photo repository server 110. The term "request" as used herein is defined as a designated stimulus and/or a solicitation generated by a subscriber and/or photo provider system, respectively 103, 105. In embodiments, the request can be received and processed in real time.

When one or more photos matching to the subscribing subscriber's inputted biometric data are found, the photos matching are sent to one or more selected destinations, in embodiments. The term "destinations," as used herein, refers to target locations and/or address chosen by the subscriber for transmission of a photograph or subset of photographs matching to the subscriber's submitted biometric data. Destinations include, for example, but not limited to, files, folders, and/or devices. In an embodiment, the photograph or subset of photographs can be transmitted and/or outputted via electronic communication such as, but not limited to, email, application "App," and/or text message to the selected one or more destinations.

In an embodiment of the present disclosure, third party servers 120 and non-subscriber devices 140 can also receive photos if requested by the subscriber. Third party servers 120 refer to, for example, but not limited to, email account servers and applications ("apps") for messaging or sharing photos such as, but not limited to, SMS, MMS, and/or WatsApp® messaging, in embodiments. A non-subscriber device 140 can be a relative's phone, for example, via an email or WatsApp® account, in an embodiment.

Figure 2:
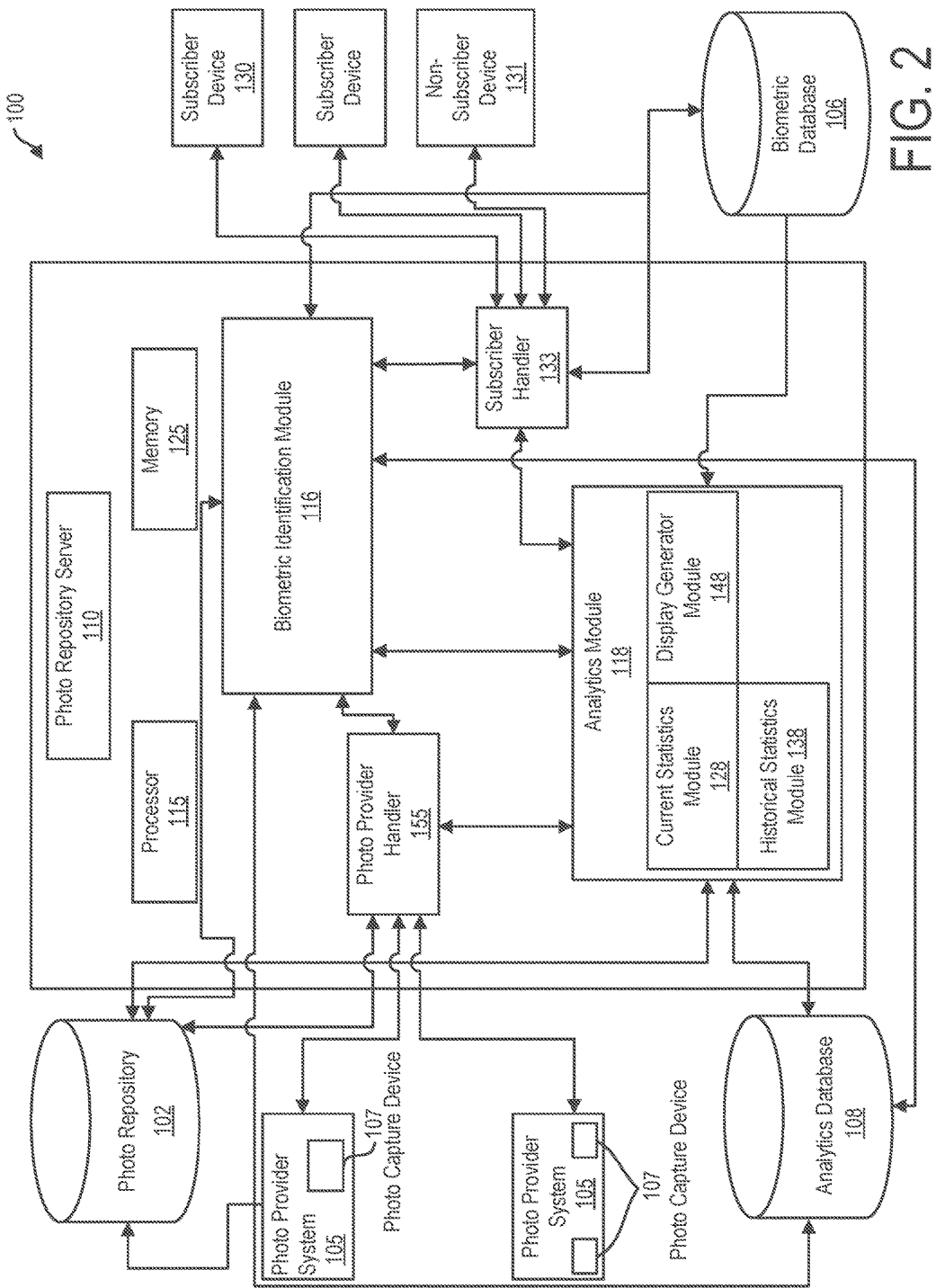
FIG. 2 is a detailed block diagram of the photo subscription system 100 shown in FIG. 1 deployed in a network.

FIG. 2 is a block diagram of the inventive photo subscription system 100 deployed in a network, in accordance with embodiments of the present disclosure, including a box diagram of the photo repository server 110. The photo repository server 110 includes a memory 125 for storing instructions, and a processor 115 in communication with the memory 125 for executing the instructions. At least one photo provider system 105 is in communication with the photo repository server 110 via a photo provider handler 155, in embodiments.

The photo provider handler 155 can handle all outgoing and incoming communications directed to or coming from the photo provider system 105 as an intermediary, in embodiments. Double sided arrows are shown, indicating two way communications between the photo provider system 105 and photo provider handler 155. In an embodiment, a photo provider system 105 can input photos directly to a photo repository 102, as shown by the arrow originating from a photo provider system 105, and concluding at the photo repository 102. In embodiments, the photo provider system 105 can input photographs via the photo provider handler 155 to the photo repository 102, as shown by the double sided arrows between the photo repository 102 and the photo provider handler 155.

Multiple photo capture devices 107 that acquire photos can be included in a single photo provider system 105. The multiple photo provider systems 105 can represent an unlimited number of photo provider systems 105. A subscriber can choose which photo provider systems 105 to subscribe to. The subscriber will then subscribe to the photo provider systems 105 he or she has a connection with and desires photographs from.

In an embodiment of the present disclosure, the photo repository 102 can operate externally and independently from the photo repository server 110, while in further embodiments, the photo repository 102 is structurally and/or functionally integrated with the photo repository server 110. The term "externally," as used herein is defined as separate, and refers to a photo repository 102 that is physically separate from the photo repository server 110. The term "independently," as used herein, is defined as autonomously. The term "integrated," as used herein, refers to a repository 102 that is a part of and incorporated within the photo repository server 110 either physically or functionally. The biometric identification module 116 can filter the photos stored in a photo repository 102 that is integrated within the photo repository server 110, or stored in an external repository 102. An external repository 102 includes, for example, but is not limited to, third party repositories 102, such as Shutterfly®, Snapfish®, and Smugmug®. The flow of information, e.g. the photographs stored in the photo repository 102, is shown by the arrows originating from the photo repository 102, flowing to the photo provider handler 155, and then reaching the biometric information module 116.

In embodiments, a subscriber submits information to a photo provider system to establish a subscriber account, which information can be stored in a biometric database 106. In an embodiment, a subscriber provides identifying information such as, but not limited to, a username, password, email address, one or more destinations for photograph transmittal, and any other information necessary to create and maintain an account. A subscriber can set his or her settings to enable automatic transmittal of photos when subscriber matches are found, or only upon manual request, other settings. A subscriber also provides at least one biometric signature, such the subscriber's face, or the face of someone associated with the subscriber, in embodiments. The term "biometric signature" as used herein is defined as a unique pattern of a bodily feature such as the retina, iris, face, fingerprint, or voice that is used for recognition and identification purposes.

In one embodiment, at least one biometric signature is assigned to each subscriber. The subscriber can select one or more biometric signatures assigned to him or her by identifying and choosing one or more faces in photos stored in the photo repository. The one or more faces chosen are associated with that subscriber account as biometric signatures. In another embodiment, the subscriber can select one or more biometric signatures assigned to him or her by submitting one or more pictures with one or more faces to associate with his or her account.

The biometric information associated with the plurality of subscriber accounts, for example, but not limited to, the faces identified by the subscriber, is stored in the biometric database 106. The biometric database 106 can be accessed by the biometric identification module 116 and by the analytics module 118, shown by the one-ended arrows going from the biometric database 106 to the biometric identification module 116 and analytics module 118. Accessing can include any of requesting, retrieving, reading, copying, receiving, or otherwise obtaining.

In an embodiment of the present disclosure, the biometric database 106 can operate externally and independently from the photo repository server 110, while in further embodiments, the biometric database 106 functions as an integrated part of the photo repository server 110. The photo repository server 110 is able to access data from an integrated biometric database 106 or from an external database 106.

In embodiments of the present disclosure, subscriber account information sent via a subscriber device 103 flows through the subscriber handler 133 and can then be transmitted to the biometric database 106. The subscriber handler 133 acts as an intermediary for a subscriber device 103, as known in the art, in embodiments, and shown by the double sided arrows between the subscriber devices 103 and subscriber handler 133. In embodiments, the subscriber handler 133 acts to receive information being sent from a subscriber device 103, and deliver the information to the correct destination. The subscriber handler 133 also accesses information intended for a subscriber device 103, and dispatches the information directly to the subscriber device 103.

For example, the subscriber handler 133 can receive a request from a subscriber device 103 for all photos in the photo repository 102 that match a specific biometric signature. The subscriber handler 133 then sends the request to the biometric identification module 116. The subscriber handler 133 can then receive a subscriber match for the requested biometric signature, or lack thereof, from the biometric identification module 116, and deliver the subscriber match to the destination requested by the subscriber. The term "subscriber match" as used herein is defined as a photograph identified as a match to a biometric signature, such as a face, associated with a subscriber.

A subscriber can request one or more destinations for photographs to be sent to that have been identified as subscriber matches. Selected destinations may include files, folders and/or devices, as described in paragraph 22. For example, subscriber matches can be sent to one or more subscriber devices 103, via the subscriber's email address. In further embodiments, the subscriber may request that subscriber matches of specific biometric signatures be sent to one or more non-subscriber devices 140, for example, a grandparent's device. In one embodiment, the processor can configure a first and second selected photo repository 102, and then output photos from the first photo repository 102 to the second photo repository 102.

In embodiments, a subscriber can choose a second photo repository 102 as a destination for subscriber matches detected for his or her account, such as, but not limited to, third party repositories 102 like Shutterfly® and Snapfish®. The biometric module 116 can filter the photos in the first photo repository 102, and output subscriber matches to the second photo repository 102, and other destinations, if selected by the subscriber.

Once photos are stored in the photo repository 102, the photos can be processed by the biometric identification module 116 which filters the photographs upon receipt of a request. The term "request," as defined above, can refer to an automatic request made by the photo repository server 110 in response to a stimulus, in one embodiment. For example, in embodiments, each time a photo is added to the photo repository 102, the biometric identification module 116 is stimulated to process and filter the photos being inputted synchronously.

In another embodiment, a manual user request submitted by a particular subscriber device 103 and/or photo provider system 105 for photos having specific biometric signatures associated with a particular subscriber stimulates the biometric identification module 116. The biometric identification module 116 can synchronously and automatically process each photograph as it is added to the repository 102, and also asynchronously, in response to user request from a subscriber via a subscriber device 103 searching for photographs associated with his or her account. The communication between the photo repository 102 and the biometric identification module 116 is demonstrated by the arrow going from the photo repository 102 to the biometric identification module 116, representing transmission of photos accessed by the biometric identification module 116.

The biometric module utilizes the data in the biometric database 106 to filter the photographs stored in the photo repository 102 and select photographs that are subscriber matches based on the biometric signatures, such as, but not limited to, faces, associated with the plurality of subscriber accounts and stored in the biometric database 106. In embodiments, a facial recognition technique is executed by the biometric module, as is known in the art. The resulting subscriber matches processed by the biometric identification 116 module are sent, represented by the one sided arrow, to an analytics database 108, in embodiments. The subscriber matches and related statistical information stored in the analytics database 108 can be accessed by the analytics module 118 for future reference and use through various analytic functions described below. The analytics module 118 can access the biometric database 106 as well, in embodiments. In an embodiment of the present disclosure, the analytic database 108 can operate externally and independently from the photo repository server 110, while in further embodiments, the analytic database 108 functions as an integrated part of the photo repository server 110.

In embodiments, the analytics module 118 calculates various statistical values, for example, but not limited to, the number of subscribers that are subscribed to a photo subscription service and the number of subscribers that are subscribed to each photo provider system. The analytics module 118 can computes statistics related to the number and percent of subscriber matches accessed as compared to a total number of photographs accessed, and/or compared to a total number of subscribers. In embodiments, the analytics module 118 can provide the number of photographs with subscriber matches transmitted to each subscriber, and the average number of subscriber matches found per photograph.

The analytics module 118 further computes the number of photographs and the percent of photographs from the photo repository 102 with at least one subscriber match, as well as the number of photographs and percent of photographs from the photo repository 102 with zero subscribers associated, or with a number of subscribers associated below a predetermined threshold. In embodiments, the number and/or percent of subscribers with a recent anomaly associated with their subscriptions can be accessed, the term "anomaly," as used herein defined as unexpected variance or incongruity. For example, if a large number of photos having subscriber matches were transmitted to a particular subscriber account, such that the large number exceeded a predetermined threshold, the analytic module 118 can register the large number as an anomaly, and store the data for reference. In an embodiment, if the number of subscriber matches detected for a subscriber is lower than a predetermined threshold, the analytic module 118 can store the statistic as an anomaly as well.

In embodiments, the total number of biometric signatures detected in the photo repository 102, and the number of unique biometric signatures identified in the total of photos stored in the photo repository can also be provided, in embodiments. The term unique biometric signatures, as described herein, is defined as a biometric signature identifying only one individual.

In embodiments, the average number of unmatched biometric signatures, for example, unmatched faces, per each picture, and the number of unmatched faces in the total of stored photographs, or in any specific subset of photographs can be computed. The number of photographs with zero biometric signatures detected, and/or a number of photos with biometric signatures that is below or above a predetermined threshold detected, the number of biometric signatures detected in each photograph, and the average number of biometric signatures detected per photograph can be computed by the analytics module 118, in embodiments of the present disclosure. The analytics module 118 additionally provides the number of subscribers with at least one selectable subscriber match, the average number of selectable subscriber matches per subscriber, and the number of subscribers with zero subscriber matches obtained in a selected time period, in embodiments.

In embodiments, for example, a photo provider system may want to increase its efficiency with regard to photographing faces associated with particular subscribers. The photo provider system 105 can access the number of photos from the last two weeks with zero faces detected by sending a request to the photo repository server 110. The request is accessed (e.g. received) by the photo repository server 110 via the photo provider system handler 155, and the analytics module 118 processes the request. A current statistics module 128 can access the number of photos added to the photo repository 102 in the last two weeks from the analytics database 108, and the number of photos added in the last two weeks with zero faces detected. In embodiments, the photo provider system can access the total number of photos with zero faces detected in the photos over time, within a specific time period, using the historical statistics module 138. The photo provider system 105 can thus ascertain whether there has been an improvement or a decline in photographing capabilities.

Analytics and Biometric computations can be accessed upon request by photo provider systems 105 and/or subscriber devices 103 via the photo provider system handler 155 and/or the subscriber handler 133, respectively. The information being exchanged between the analytics module 118 and the analytics databases 108 is shown with double sided arrows representing sending and accessing information to and from the analytics database 108. The double sided arrows shown represent communications between the analytics module 118 and the photo provider system handler 155, and also between the analytics module 118 and the subscriber handler 133. The analytics module 118 can access the photo repository 102 and the biometric database 106, shown by the arrows originating from the photo repository 102 and the biometric database 106, and concluding at the analytics module 118.

In embodiments, the analytics module 118 can also access the identity of a particular face not associated with any current subscribers. For example, a particular subscriber of photo provider system "A" sets his or her subscriber account settings to specifications allowing subscribers of other photo provider systems (such as photo provider system B) to identify a face associated with his or her particular account. The face associated with this particular subscriber of photo provider system "A" can be identified by detecting biometric identifiers linked to a photo. The identity of faces that are not associated with a subscriber of photo provider system "B's" subscription service can be identified based on biometric identifiers linked to the subscriber's account, who is subscribed to photo provider system "A's" service. Biometric identifiers can be any biological attribute that can be used for identification.

In embodiments, the above described analytics computed by the analytics module 118 can be accessed via the display generator module 148 shown in FIG. 2 in a detailed view display, or in a summary view display. The detailed view display can show more details of the analytics computed by the analytics module 118 and stored by the analytics database 108, in embodiments. The detailed view can display details such as, but not limited to, a trend showing a change in numbers over time, such as an increase or decrease in numbers, featuring details that are broken down over smaller increments of time, versus an overview, in embodiments. The summary view display for example, but not limited to, fewer details, and only a summary of analytics requested by the photo provider system and/or the subscriber in account settings, or by manual request, in embodiments. In embodiments, the historical statistics and current statistics modules 128,138 can be incorporated into the display generator module 148.

The detailed and summary views can be included in a graphical user interface (GUI) that displays information graphically. Additionally, the GUI can include interactive display elements that a user can activate to submit requests and/or provide information. In embodiments, the links between any of the photo repository 102, photo provider system 105, analytics database 108, photo repository server 110, third party device 131, and subscriber device 103 can traverse one or more networks, such as network 120. Also, in embodiments, links between any of the analytics module 118 and/or its sub-modules, the current statistics module 128, the historical statistics module 138, and the display generator module 148; the biometric module 116; and/or the photo provider system handler 155 can traverse one or more networks.

Figure 3:
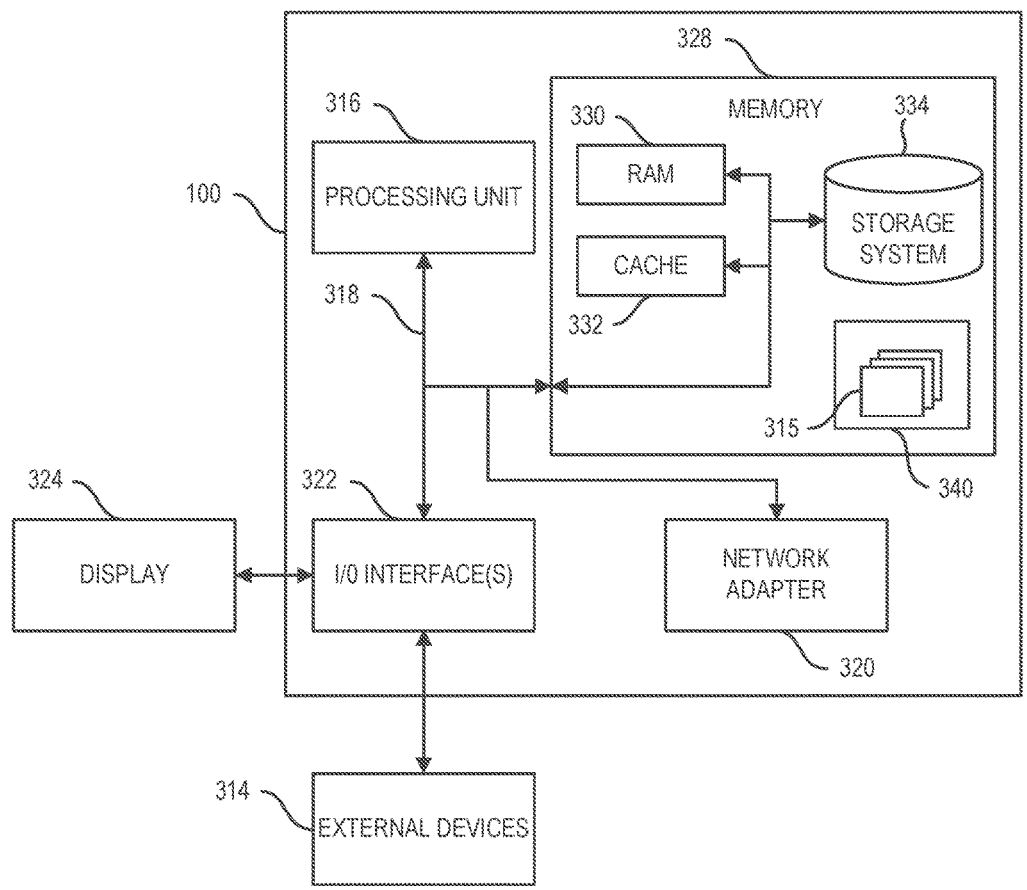
FIG. 3 illustrates internal and external components of a photo repository server of FIG. 2 in accordance with an illustrative embodiment of the present disclosure.

FIG. 3 illustrates internal and external components of a photo repository server 110, such as the photo repository server 110 shown in FIG. 2 in accordance with an illustrative embodiment of the present disclosure. The photo repository server 110 is shown in FIG. 3 in the form of a general—purpose computing device. The components of the photo repository server 110 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, Micro Channel (MCA) bus, Enhanced ISA (EISA) bus, Video Electronics Standards Association (VESA) local bus, and Peripheral Component Interconnect (PCI) bus.

The photo repository server 110 typically includes a variety of computer system readable media. Such media may be any available media that are accessible by the photo repository server 110, and it includes both volatile and non-volatile media, removable and non-removable media.

System memory 328 can include computer system readable media in the form of volatile memory, such as random access memory (RAM) 330 and/or cache memory 332. The photo repository server 110 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive (e.g. floppy disk"), and an optical disk drive for reading from and writing to a removable, non-volatile optical disk drive such as CD-ROM, DVD-ROM or other optical medial can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 313, such as the biometric identification module 116, and analytics module 118, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions an/or methodologies of embodiments of the disclosure as described herein.

The photo repository server 110 may also communicate with one or more external devices such as a keyboard, a pointing device, a display, etc.; one or more devices that enable a user to interact with the photo repository server 110; and/or any devices (e.g., network card, modem, etc.) that enable the photo repository server 110 to communicate with with one or more other computing devices, Such communication can occur via Input/Output (I/O) interfaces 322.

Still yet, the photo repository server 110 can communicate with one or more networks such as a local area network (LAN), a general wide area network (WAN), an/or a public network (e.g., the Internet) via network adapter 320. As depicted, network adapter 320 communicates with other components of the photo repository server 110 via bus 318. It should be understood that although not shown, other hardware and/or software components could be used in conjunction with the photo repository server 110. Examples, include, but are not limited to: microcode, device drivers, redundant processing units, external disk drive arrays, RAID systems, tape drives, and data archival storage systems, etc.

Figure 4:
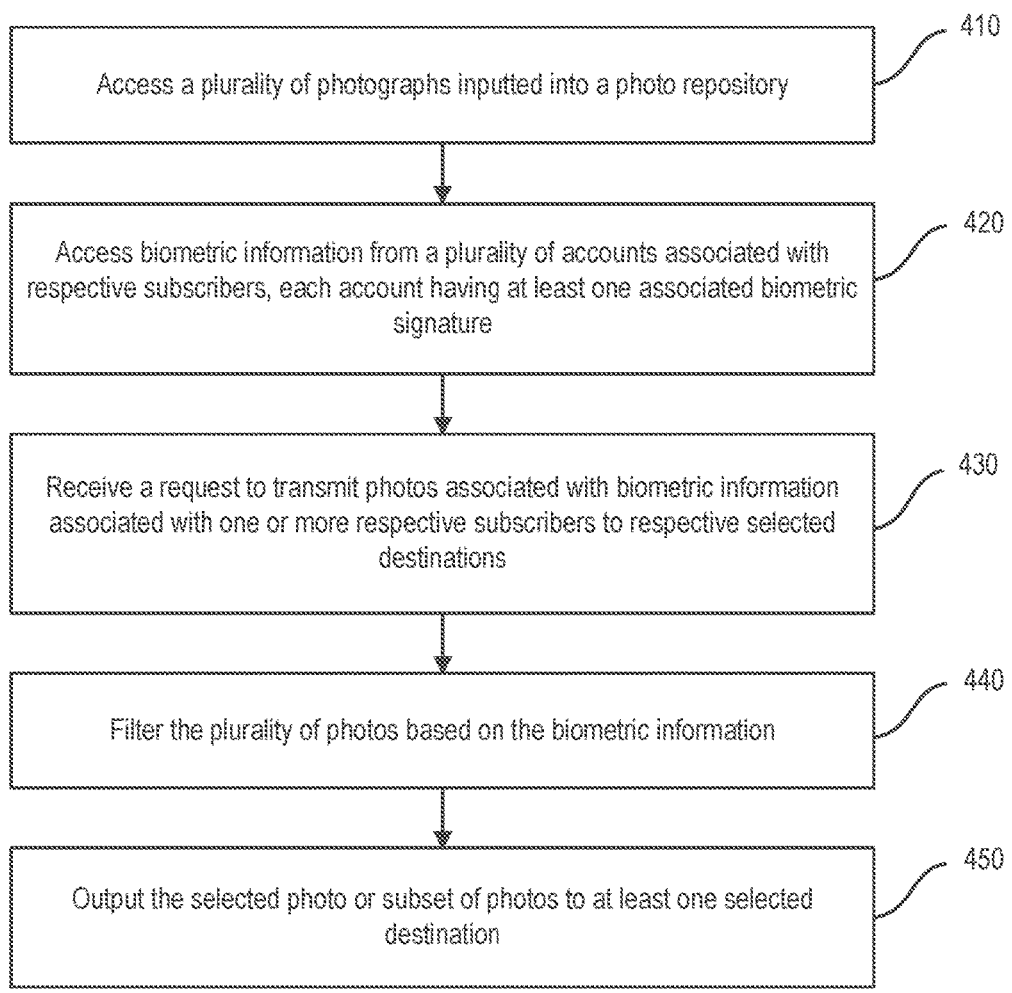
FIG. 4 is a flowchart of example operational steps of a photo subscription method used in the photo repository server 110 of FIG. 2 in accordance with embodiments of the present disclosure.
Figure 5:
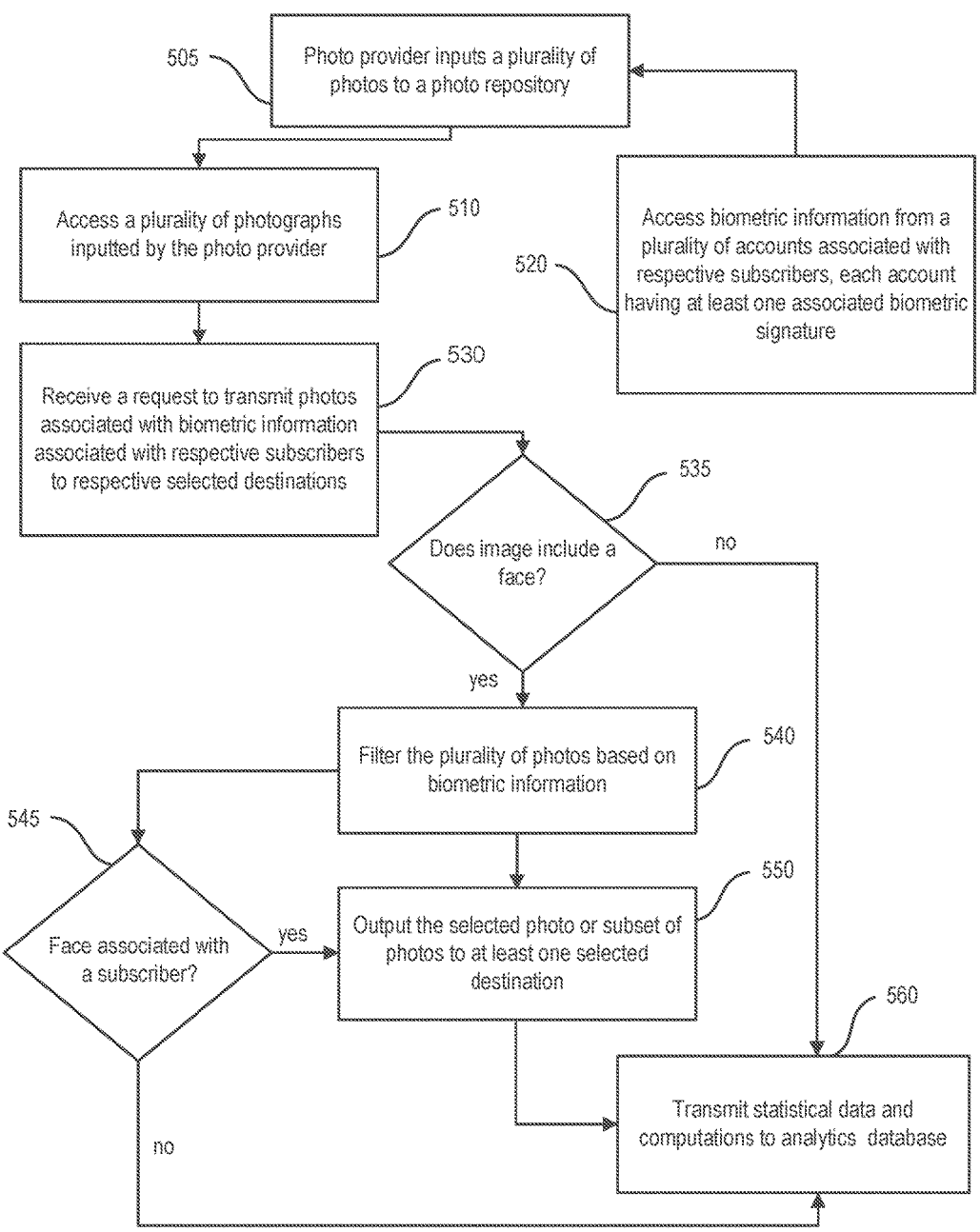
FIG. 5 is a flowchart of example operational steps of a photo subscription method, used in the photo repository server 110 of FIG. 2 in accordance with embodiments of the present disclosure.

FIGS. 4 and 5 are flowcharts of example operational steps of a photo repository method used in the photo repository server 110 of FIG. 2, in accordance with embodiments of the present disclosure. Before turning to the descriptions of FIGS. 4 and 5, it is noted that the flowchart diagrams in FIGS. 4 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step or performed in parallel. In some embodiments, one or more steps may be omitted. In some embodiments, one or more additional steps may be performed.

FIG. 4 shows an embodiment of the method of the present disclosure beginning with a first step 410 of accessing a plurality of photographs inputted into a photo repository 102. In embodiments, the biometric identification module 116 shown in FIG. 2 accesses photographs from the photo repository 102. In the subsequent step 420, biometric information is accessed from the biometric database 106, by the biometric identification module 116. The biometric information stored in the biometric database 106 can be accessed from a plurality of accounts associated with a plurality of respective subscribers. Each subscriber account of the plurality of accounts is associated with at least one biometric signature, in embodiments.

Step 430 proceeds with receiving a request to transmit photos associated with one or more biometric signatures associated with one or more respective subscribers, to be sent to selected destinations, in an embodiment of the present disclosure. The subscriber handler 133 can receive this request from a subscriber device 106, in embodiments. After receiving the request, the plurality of photos from the photo repository 102 are filtered in step 440, based on the biometric information accessed in step 420 from the biometric database 106.

In embodiments, the photo or subset of photos selected based on the filtering results from step 440 is outputted to at least one selected destination in step 450. In step 450, the subscriber handler 133 receives the resulting selected photos or subset of photos from step 440 and sends the selected photo or photos to one or more selected destinations, for example, but not limited to, a selected subscriber device 103 or non-subscriber device 140, via, e.g., the third party server, in accordance with the request received at step 430.

FIG. 5 shows a photo provider system 105, in embodiments, inputting a plurality of photos to a photo repository 102, at step 505 via a photo capture device 107. The biometric identification module 116 accesses a plurality of photographs inputted by the photo provider system 105 at step 510. At step 520, the photo provider system 105 accesses biometric information stored in the biometric database 106 and/or the analytic database 108, in embodiments.

The biometric data can be inputted by a plurality of subscribers maintaining a plurality of subscriber accounts, each account having at least one biometric signature. At step 530, the subscriber handler 133 receives a request from a subscriber device 103 to transmit photos associates with biometric signatures associated with respective subscribers to respective destinations.

Upon filtering the photographs in the photo repository 102 at critical point 535, the filtering module 126 determines if a face is detected in the photo. If a face is detected, the photos stored in the photo repository 102 are filtered based on the biometric information accessed from the biometric database 106 in step 540. If no face is detected, the process continues to step 570, and the statistical information and computations executed by the biometric module 116 are transmitted to the analytics database 108.

In step 545, if a face was detected at critical point 535, the filtering module 116 determines whether the face or faces in each photograph are associated with a subscriber. At critical point 545, if a face in a photograph is determined to be associated with a subscriber, the photo is outputted to at least one selected destination in step 550. If no face associated with a subscriber is detected in any photographs at critical point 545, the method proceeds to step 560. After a selected photo or subset of photos is outputted to at least one selected destination in step 550, the method proceeds to step 560, as well. In step 560, statistical data and computations performed by the biometric information module 116 are transmitted to the analytics database for future computations and/or requests for analytic data.

Figure 6:
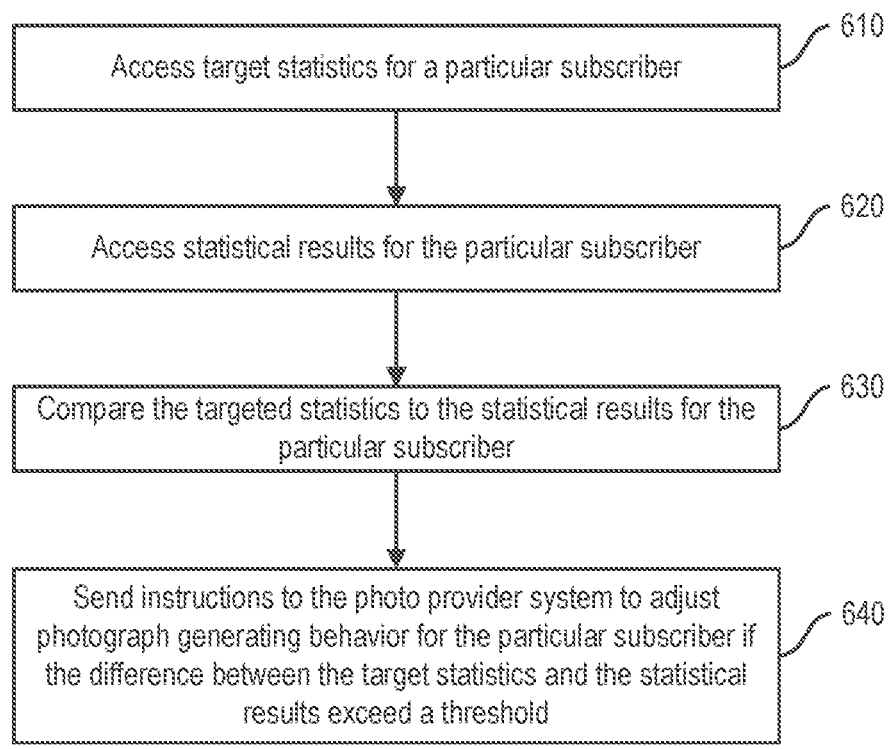
FIG. 6 is a flowchart of example operational steps of a photo subscription method, used in the photo repository server 110 of FIG. 2 in accordance with embodiments of the present disclosure.

FIG. 6 is a flowchart of example operational steps of a photo subscription method used in the photo repository server 110 of FIG. 2, in accordance with embodiments of the present disclosure. In an embodiment, the analytics module 118 accesses target statistics for a particular subscriber in step 610. The term "target statistics," as used herein, refers to a plurality of goals in the form of predetermined numbers. A photo provider system 105 can set the target statistics for each individual subscriber or even for each biometric signature within a time period. Target statistics can be predetermined for an individual subscriber based on a metal level membership system, such that members purchasing a higher level metal level, such as gold and platinum, receive more benefits, including more pictures generated in a specified time period.

In an embodiment, a photo provider system 105 may assign target statistics to subscribers, or even non-subscribers based on, for example, but not limited to, race, ethnicity, gender, and/or age. A photo provider system 105 may choose to set a high target statistic aimed at generating a high number of photographs of individuals of a particular socioeconomic and/or ethnic group for marketing purposes. Photographing many pictures of individuals belonging to a specific socio-economic and/or ethnic group can provide effective marketing and appeal to members of the specific socio-economic or ethnic groups photographed, thus increasing subscribers from targeted groups. Additionally, a photo provider system 105 may assign target statistics to individuals and/or groups of people to achieve security objectives. For example, increased access of photos and/or multimedia content can provide important intelligence and information concerning a suspected individual or group.

Step 620 subsequently continues with accessing statistical results for the particular subscriber for whom target statistics were accessed. The term "statistical results," as used herein refers to the numbers of photographs in fact generated and actual associated data. In step 630, the analytics module 118 can compare the target statistics to the actual statistical results for the particular subscriber, and/or plurality of subscribers. If the difference between the predetermined target statistics and the statistical results for the particular subscriber exceeds a predetermined threshold, the analytics module 118 sends instructions to the photo provider system 105 to adjust its photograph generating behavior for the particular subscriber, or plurality of subscribers in step 640.

The instructions to adjust photograph generating behavior can include instructions to increase or decrease photograph generation in a particular time period for the particular subscriber or subscribers. Additionally, the photo provider system 105 can be instructed to increase photograph generation of subscribers versus non-subscribers, if statistical results show too many photographs with no faces or with biometric signatures of non-subscribers. Such instructions can also request improvement in photography technique, and/or equipment, for example to promote capturing faces in photographs, and/or high resolution photos.

Figure 7:
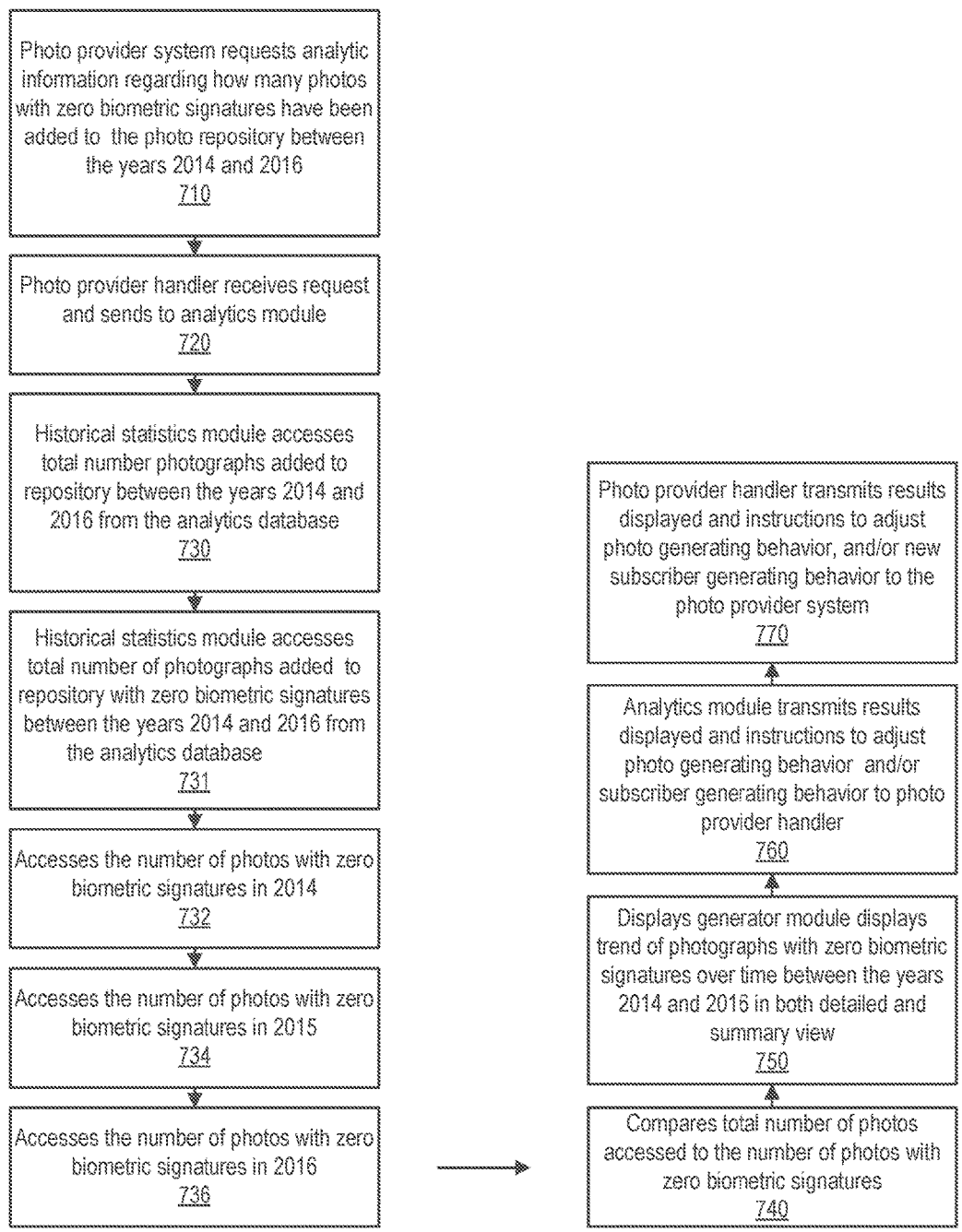
FIG. 7 is a flowchart of example operational steps of a photo subscription method, used in the photo repository server 110 of FIG. 2 in accordance with embodiments of the present disclosure.

FIG. 7 is a flowchart of example operational steps of a photo subscription method used in the photo repository server 110 of FIG. 2, in accordance with embodiments of the present disclosure. A photo provider system 105 may want to access and increase its efficiency as regards to capturing people, and specifically subscribers, in photos. The photo provider system 105 may also want to quantify how many biometric signatures are captured in photos, within a selected time period, such that the biometric signatures are associated with subscribers to other photo provider systems 105, but not the instant photo provider system 105. The photo provider system 105 may want to attempt to promote the subscription of those biometric signatures (detected by biometric identifiers linked to the photos as described above) to the instant photo provider system 105. To answer the above queries, the photo provider system 105 can send a request for analytic information to the photo repository server 110.

For example, the photo provider system 105 can request the number of photos with zero biometric signatures that have been added to the photo repository 102 from the year 2014 through the duration of the year 2016 in step 710. The photo provider handler 155 receives the request and sends it to the analytics module 118 in step 720. In step 730, the historical statistics module 138 can access the total number of photographs added to the photo repository 102 within the years 2014 through 2016 from the analytics database 108. The historical statistics module 138 can access from the analytics database 108 the number of photographs added to the photo repository 102 with zero biometric signatures included between the years 2014 through 2016 in step 731.

In step 732, the historical statistics module 138 can access the number of photos with zero biometric signatures in the year 2014. The historical statistics module 138 can access the number of photos with zero biometric signatures in the year 2015 in step 734, and the number of photos with zero biometric signatures in the year 2016 in step 736. In step 740, the analytics module 118 can compare the total number of photos stored accessed to the number of photos with zero biometric signatures. The display generator module 148 can display a trend of photographs with zero biometric signatures over time, from the year 2014 through the year 2016 in a detailed and in a summary view in step 750.

The analytics module 118 can then transmit the results displayed by the display generator module 148 to the photo provider handler 155, as well as transmit instructions for the photo provider system 105 to adjust photo generating behavior, and/or to adjust new subscriber generating behavior in step 760. The photo provider handler 155 then transmits the displayed results to the photo provider system 105, and instructions to the photo provider system 105 to adjust its photo generating behavior and/or to adjust its new subscriber generating behavior, in step 770. For example, if the photo provider system 105 discovers that there are relatively more photos having biometric signatures of non-subscribers to the instant photo provider system's 105 subscription service, the photo provider system 105 can take steps to photograph subscribers as opposed to non-subscribers. Additionally, the photo provider system 105 can make efforts to appeal to the non-subscriber subjects photographed by the photo provider capture devices 107, and encourage these subjects to subscribe to the instant photo provider system 105.

Figure 8:
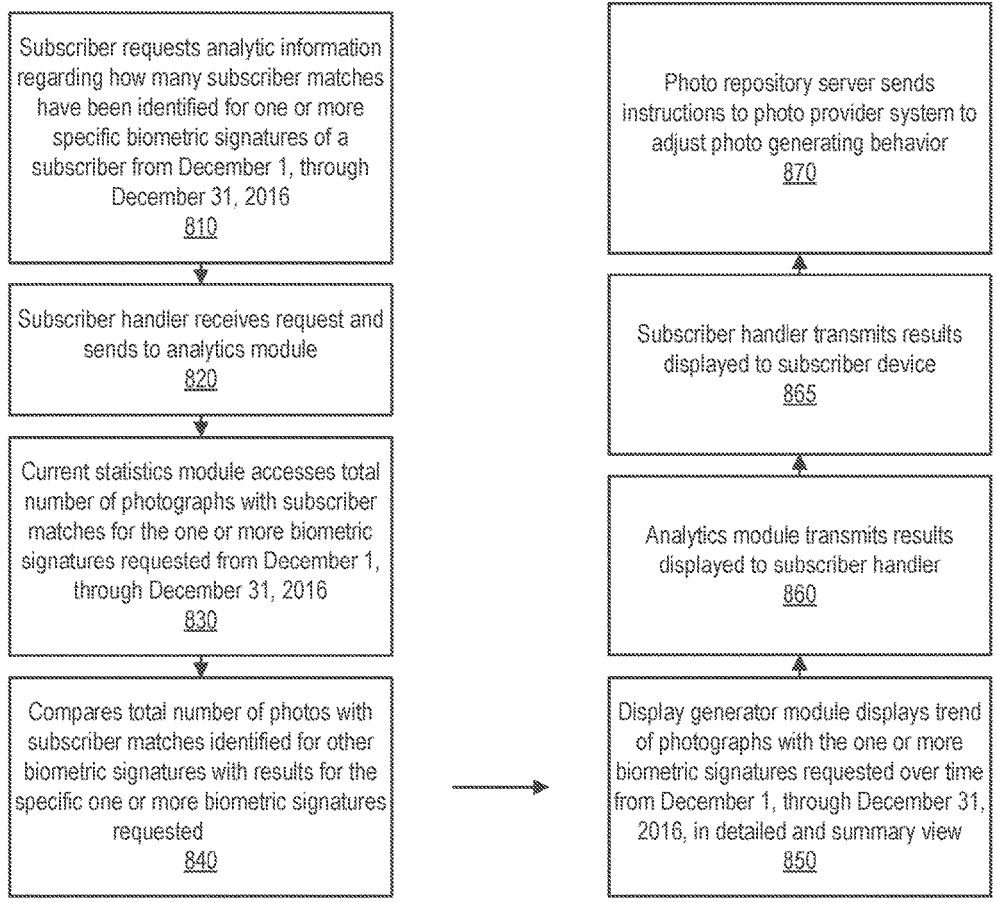
FIG. 8 is a flowchart of example operational steps of a photo subscription method, used in the photo repository server 110 of FIG. 2 in accordance with embodiments of the present disclosure.

FIG. 8 is a flowchart of example operational steps of a photo subscription method used in the photo repository server 110 of FIG. 2, in accordance with embodiments of the present disclosure. In step 810, a subscriber requests analytic information, via a subscriber device 103, regarding how many subscriber matches have been identified for a biometric signature of that subscriber in a specified time period, for example, from Dec. 1, through Dec. 31, 2016. The subscriber handler 133 can receive the request and send the request to the analytics module 118 in step 820.

The current statistics module 128 can access the total number of photographs with subscriber matches for the biometric signature requested in the time period of Dec. 1, through Dec. 31, 2016, in step 830. Subsequently, in step 840, the current statistics module 128 can compare the total number of photos identified as having subscriber matches for other biometric signatures, with the number of photos identified as having subscriber matches for the specific biometric signature that was requested. In step 850, the display generator module 148 can then display the photographs having the biometric signature as a trend over a specified time period, for example, from Dec. 1, through Dec. 31, 2016. The trend of photographs can be displayed in a detailed and in a summary view, in embodiments. The photo repository server 110 can send instructions to the photo provider system 105, in embodiments, to adjust photo generating behavior in step 870. The analytics module 118 transmits the results displayed to the subscriber handler 133, and the subscriber handler 133 then transmits these results to the selected subscriber destination, for example, the subscriber device 103 in step 865.

The block diagrams and flowcharts in the Figures illustrate the architecture, functionality, and step of possible implementations of the systems, methods and computer program products according to various embodiments of the present disclosure. In this regard, each block in the flowchart or block diagrams may represent a module, segment, or portion of the code, which comprises one or more executable instructions for implementing the specified logical function (s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will be also be noted that each block of the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments, The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a photo subscription service using biometric identification, the method comprising:
    accessing a plurality of photographs in a photo repository;
    accessing biometric data from a plurality of accounts, associated with a plurality of subscribers, each account having at least one associated biometric signature;
    receiving a request from a subscriber of the plurality of subscribers to transmit photos associated with biometric data associated with respective subscriber to at least one selected destination;
    filtering said plurality of photos based on said biometric data;
    outputting a photo or subset of photos based on said filtering to said at least one selected destination, said outputting including, transmitting said selected photo or subset of photos to a plurality of files, folders, and/or devices based on each set of biometric data found in said photo or subset of photos, and each file, folder, and/or device being associated with at least one biometric signature, and said at least one biometric signature is associated with at least one subscriber;
    receiving a request for analytic data associated with the photo subscription service method;
    accessing an analytic database;
    computing statistics associated with said request;
    transmitting said results of said computing statistics to a selected destination;
    computing statistics related to subscriber matches accessed as compared to a total number of photographs accessed, and/or compared to a total number of subscribers, including at least one of: the number and/or percent of unique subscriber matches identified as compared to the number of subscribers subscribed; the number and/or percent of subscriber matches identified each subscriber has received; the number and/or percent of subscribers with a recent anomaly; the number and/or percent of photos inputted by a photo provider system with zero subscriber matches detected; the number and/or percent of photos inputted by a photo provider system with zero biometric signatures detected; and the number and/or percent of individual potential subscribers detected in photographs; and
    sending instructions to said photo provider system to adjust photograph generating behavior and/or subscriber generating behavior, based on said computing statistics.

2. The method of claim 1, further comprising the step of:
    accessing target statistics for a particular subscriber;
    accessing statistical results for said particular subscriber;
    comparing said target statistics to said statistical results for said particular subscriber; and
    sending instructions to said photo provider system to adjust photograph generating behavior for said particular subscriber if the difference between said target statistics and said statistical results for said particular subscriber exceeds a threshold.

3. The method of claim 2, wherein said step of sending instructions to adjust photograph generating behavior further comprises sending instructions to increase or decrease photograph generation in a particular time period for said particular subscriber.

* * * * *